(12) United States Patent
Sugiyama et al.

(10) Patent No.: US 11,060,895 B2
(45) Date of Patent: Jul. 13, 2021

(54) GAS METER INCLUDING A MEASUREMENT UNIT IN COMMUNICATION WITH A SHUTOFF VALVE IN AN EXTENDED SECTION WITHIN A METER BODY

(71) Applicant: Panasonic Intellectual Property Management Co., Ltd., Osaka (JP)

(72) Inventors: Masaki Sugiyama, Kyoto (JP); Hiroaki Katase, Fukuoka (JP); Naoto Naganuma, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/499,942

(22) PCT Filed: May 10, 2018

(86) PCT No.: PCT/JP2018/018058
§ 371 (c)(1),
(2) Date: Oct. 1, 2019

(87) PCT Pub. No.: WO2018/216482
PCT Pub. Date: Nov. 29, 2018

(65) Prior Publication Data
US 2020/0056916 A1    Feb. 20, 2020

(30) Foreign Application Priority Data

May 22, 2017 (JP) .............................. JP2017-100534
May 22, 2017 (JP) .............................. JP2017-100535

(51) Int. Cl.
*G01F 1/66* (2006.01)
*G05D 7/00* (2006.01)

(52) U.S. Cl.
CPC .............. *G01F 1/662* (2013.01); *G01F 1/667* (2013.01); *G05D 7/00* (2013.01)

(58) Field of Classification Search
CPC ................ G01F 15/18; G01F 1/78; G01F 3/20
See application file for complete search history.

(56) References Cited

U.S. PATENT DOCUMENTS 6,220,091 B1 * 4/2001 Chen .................... C23C 16/4482
438/14
9,032,790 B2 * 5/2015 Braun .................... G01F 1/6842
73/269

(Continued)

FOREIGN PATENT DOCUMENTS

CN    205642485    10/2016
JP    11-183228    7/1999
(Continued)

OTHER PUBLICATIONS

International Search Report of PCT application No. PCT/JP2018/018058 dated Jul. 17, 2018.

(Continued)

*Primary Examiner* — Harshad R Patel
(74) *Attorney, Agent, or Firm* — Wenderoth, Lind & Ponack, L.L.P.

(57) ABSTRACT

A gas meter includes a meter body having a meter inlet into which a fluid-to-be-measured is to flow and a meter outlet from which the fluid-to-be-measured is to flow out, and an extended section extending from the meter inlet to an interior of the meter body. The gas meter further includes a flow rate measurement unit inside the meter body, the flow rate measurement unit having a measurement flow passage having a straight tubular shape, a lead-in port and a lead-out port for the fluid-to-be-measured, and a shutoff valve in an internal passage of the extended section. The lead-in port is (Continued)

airtightly connected to the extended section so as to communicate with the internal passage.

8 Claims, 4 Drawing Sheets

(56) References Cited

U.S. PATENT DOCUMENTS

| | | | |
|---|---|---|---|
| 9,372,105 B2* | 6/2016 | Miyata | G01F 15/14 |
| 9,784,607 B2* | 10/2017 | Wong | G01F 1/78 |
| 10,247,594 B2* | 4/2019 | Smith | F16K 31/54 |
| 10,345,212 B2* | 7/2019 | Fraser | B01D 19/0063 |
| 2005/0145278 A1* | 7/2005 | Igawa | G05D 16/185 |
| | | | 137/486 |
| 2006/0027267 A1* | 2/2006 | Fritze | F17D 5/02 |
| | | | 137/487.5 |
| 2010/0219933 A1 | 9/2010 | Ueki et al. | |
| 2010/0229653 A1* | 9/2010 | Tabellario | G01F 15/002 |
| | | | 73/861.11 |
| 2013/0167655 A1 | 7/2013 | Fujii et al. | |
| 2013/0312537 A1* | 11/2013 | Miyata | G01F 15/14 |
| | | | 73/861.28 |
| 2015/0107369 A1* | 4/2015 | Downie | G01F 1/78 |
| | | | 73/861.19 |
| 2015/0137989 A1* | 5/2015 | Park | G01F 3/22 |
| | | | 340/870.02 |
| 2015/0143919 A1* | 5/2015 | Nakano | G01F 1/662 |
| | | | 73/861.28 |
| 2017/0185091 A1* | 6/2017 | Johnson | G05D 7/0635 |
| 2017/0253474 A1* | 9/2017 | Carapelli | B67D 7/04 |
| 2017/0370754 A1* | 12/2017 | Croteau | G01F 5/00 |
| 2018/0209940 A1* | 7/2018 | Carapelli | B67D 7/04 |
| 2018/0229997 A1* | 8/2018 | Long | B67D 7/04 |
| 2019/0135608 A1* | 5/2019 | Carapelli | B67D 7/04 |
| 2020/0149938 A1* | 5/2020 | Sugiyama | G01F 1/66 |

FOREIGN PATENT DOCUMENTS

| | | |
|---|---|---|
| JP | 2001-141096 | 5/2001 |
| JP | 2002-148091 | 5/2002 |
| JP | 2003-185477 | 7/2003 |
| JP | 2004-151070 | 5/2004 |
| JP | 2012-018031 | 1/2012 |
| JP | 2012-177572 | 9/2012 |
| JP | 2012-247299 | 12/2012 |
| JP | 2013-057613 | 3/2013 |
| JP | 2014-98563 | 5/2014 |
| WO | 2012/063437 | 5/2012 |

OTHER PUBLICATIONS

The Extended European Search Report dated Apr. 2, 2020 for the related European Patent Application No. 18804993.6.
Office Action dated Jun. 2, 2020 in corresponding Chinese Patent Application No. 201880028568.0, with English Translation of Search Report.

* cited by examiner

GAS METER INCLUDING A MEASUREMENT UNIT IN COMMUNICATION WITH A SHUTOFF VALVE IN AN EXTENDED SECTION WITHIN A METER BODY

CROSS-REFERENCE TO RELATED APPLICATIONS

This application is a U.S. national stage application of the PCT International Application No. PCT/JP2018/018058 filed on May 10, 2018, which claims the benefit of foreign priority of Japanese patent application No. 2017-100534 filed on May 22, 2017 and Japanese patent application No. 2017-100535 filed on May 22, 2017, the contents all of which are incorporated herein by reference.

TECHNICAL FIELD

The present invention relates to a gas meter which includes a flow rate measurement unit incorporated therein, the flow rate measurement unit measuring a flow rate of a fluid such as a gas, and has a cutoff function.

BACKGROUND ART

A so-called electronic meter utilizing ultrasonic wave or a flow sensor has been put into practical use as a flowmeter such as a gas meter. As an application of such an electronic meter, a flow rate measurement unit capable of independently measuring a flow rate and a gas meter using the flow rate measurement unit have been proposed.

The gas meter has a built-in shutoff valve that exerts a security function of cutting off a gas when a monitored flow rate of the gas is found to be problematic.

Figure 7:
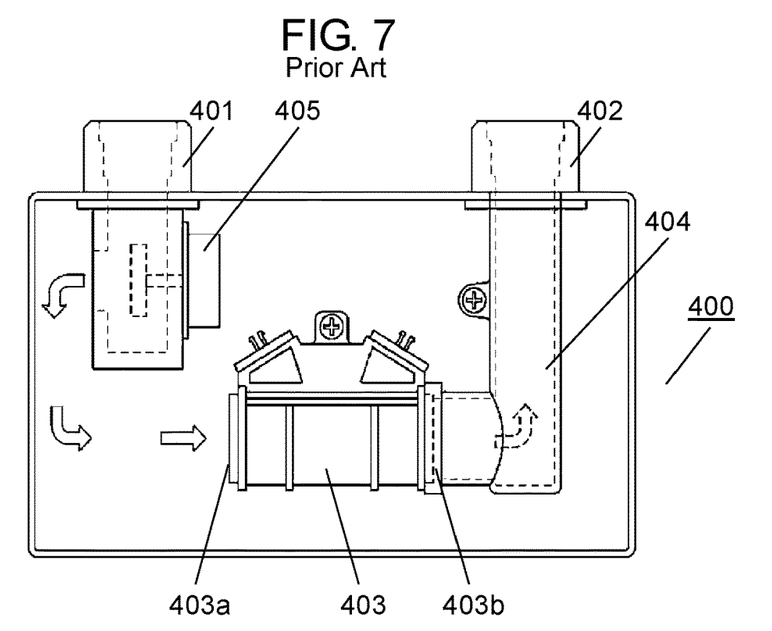
FIG. 7 is a sectional view of a gas meter using a conventional flow rate measurement unit.

FIG. 7 depicts such a gas meter, showing flow rate measurement unit 403 housed in gas meter 400 having inlet 401 and outlet 402. Shutoff valve 405 is connected to inlet 401. A gas having flown into inlet 401 flows through a passage inside shutoff valve 405 and spreads in a body of gas meter 400. The gas, i.e., a fluid-to-be-measured spreading in the body of gas meter 400 flows into lead-in port 403a of flow rate measurement unit 403 and then flows out of lead-out port 403b connected to outlet pipe 404 (see, for example, Unexamined Japanese Patent Publication No. 2012-247299—hereinafter, "JP 2012-247299").

Figure 8:
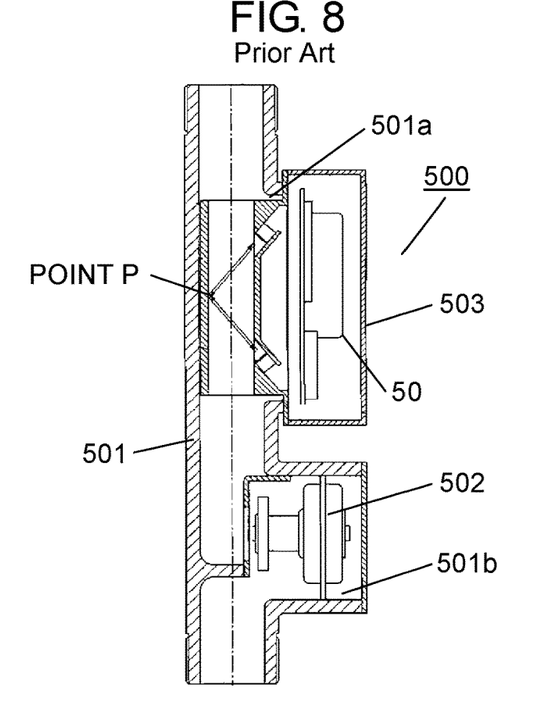
FIG. 8 is a sectional view of a gas meter using another conventional flow rate measurement unit.

As a gas meter of a different form, gas meter 500 shown in FIG. 8 has also been proposed. Gas meter 500 has a configuration in which shutoff valve 502 and flow rate measurement unit 503 are fitted externally to a middle part of pipe 501 having a straight pipe shape (see, for example, Unexamined Japanese Patent Publication No. 2012-18031—hereinafter, "JP 2012-18031").

SUMMARY OF THE INVENTION

However, in the case of the gas meter described in JP 2012-247299, because flow rate measurement unit 403 is separated from shutoff valve 405, the gas having spread in gas meter 400 through shutoff valve 405 flows into flow rate measurement unit 403 from various directions. An inflow of the gas to flow rate measurement unit 403 is thus affected by a shape and size of the interior of gas meter 400, which makes it difficult to keep the inflow of the gas to flow rate measurement unit 403 constant. This has led to a need of individually optimizing a shape of flow rate measurement unit 403, a flow coefficient, or the like depending on a shape of the body of the gas meter.

In the case of the gas meter described in JP 2012-18031, pipe 501 has opening 501a for fitting flow rate measurement unit 50 therein and opening 501b for fitting shutoff valve 502 therein, openings 501a and 501b being formed separately. This configuration poses a problem that downsizing of the gas meter is difficult. The configuration poses another problem that a sealing structure becomes complicated because of a need of making each of openings 501a, 501b airtight to prevent a gas leakage.

The present invention provides a gas meter that has a cutoff function, and that allows stable flow rate measurement regardless of a shape of the built-in gas meter and allows downsizing of the gas meter.

A gas meter according to an aspect of the present invention includes a meter body having a meter inlet into which a fluid-to-be-measured flows and a meter outlet from which the fluid-to-be-measured flows out; an extended section extended from the meter inlet to the interior of the meter body; a flow rate measurement unit disposed inside the meter body, the flow rate measurement unit having a measurement flow passage having a straight tubular shape and provided with a lead-in port and a lead-out port for the fluid-to-be-measured; and a shutoff valve disposed in an internal passage of the extended section. In the measurement unit, the lead-in port is airtightly connected to the extended section to communicate with the internal passage.

With this configuration, a gas flow from the shutoff valve to the flow rate measurement unit becomes constant. As a result, stable flow rate measurement can be performed regardless of a shape of the gas meter. In addition, the shutoff valve and the flow rate measurement unit are directly connected across a minimum distance, which allows downsizing of the gas meter.

A gas flow from the shutoff valve to the measurement flow passage also becomes constant, which allows stable flow rate measurement regardless of the shape of the gas meter.

According to the gas meter of the present invention, stable flow rate measurement can be performed regardless of the shape of the body of the gas meter, and because of the shutoff valve and the flow rate measurement unit being directly connected across the minimum distance, the gas meter can be downsized.

A gas meter according to another aspect of the present invention includes a meter body having a meter inlet into which a fluid-to-be-measured flows and a meter outlet from which the fluid-to-be-measured flows out; an extended section extended from the meter outlet to the interior of the meter body; a flow rate measurement unit disposed inside the meter body, the flow rate measurement unit having a measurement flow passage having a straight tubular shape and provided with a lead-in port and a lead-out port for the fluid-to-be-measured; and a shutoff valve disposed in an internal passage of the extended section. In the flow rate measurement unit, the lead-out port is airtightly connected to the extended section to communicate with the internal passage.

With this configuration, a flow rate measurement section and the shutoff valve can be integrated together, and the shutoff valve and the flow rate measurement unit can be directly connected across a minimum distance. As a result, the gas meter can be downsized.

The shutoff valve makes gas flow constant. As a result, stable flow rate measurement can be performed regardless of a shape of the gas meter.

According to the gas meter of the present invention, the shutoff valve and the flow rate measurement unit can be directly connected across the minimum distance, which allows downsizing of the gas meter.

DESCRIPTION OF EMBODIMENTS

Hereinafter, embodiments of a gas meter according to the present invention will be described with reference to the accompanying drawings. The same constituent elements will be denoted by the same reference numerals. Constituent elements already described will not be described repeatedly. The present invention is not limited by the exemplary embodiments that will be described below.

In this description, a gas meter is connected to a pipe that delivers a fluid to measure a flow rate of the fluid flowing through the pipe. The gas meter has a flow rate measurement unit incorporated therein. This flow rate measurement unit measures the flow rate of the fluid. In other words, the flow rate measurement unit is a component of the gas meter.

First Exemplary Embodiment

Figure 1:
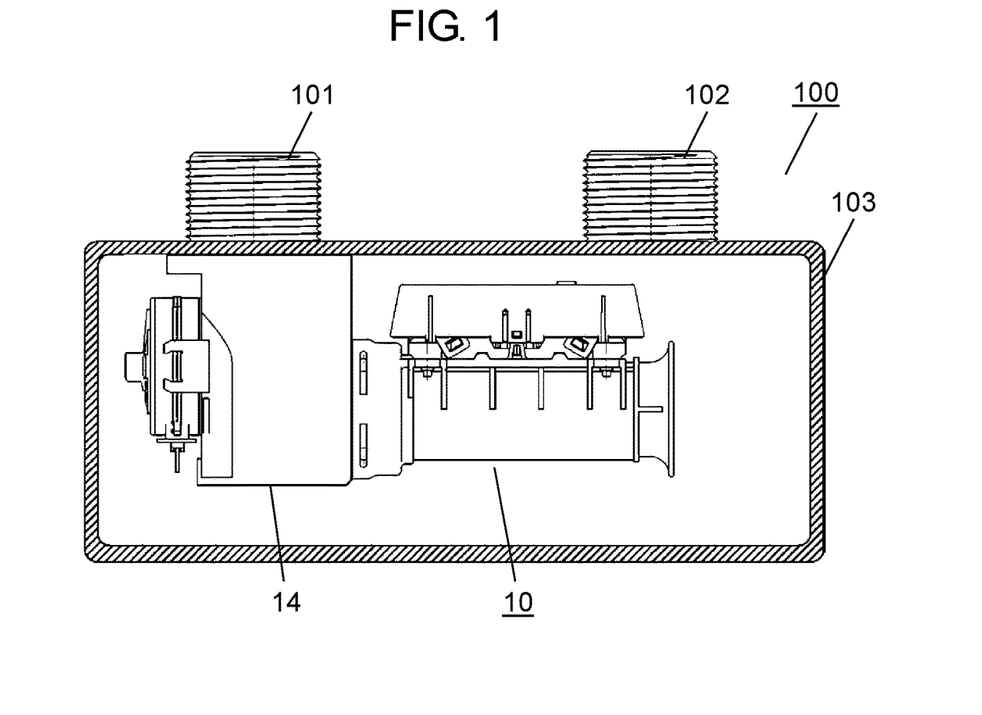
FIG. 1 is a side sectional view of a principle part of a gas meter according to a first exemplary embodiment of the present invention.
Figure 2:
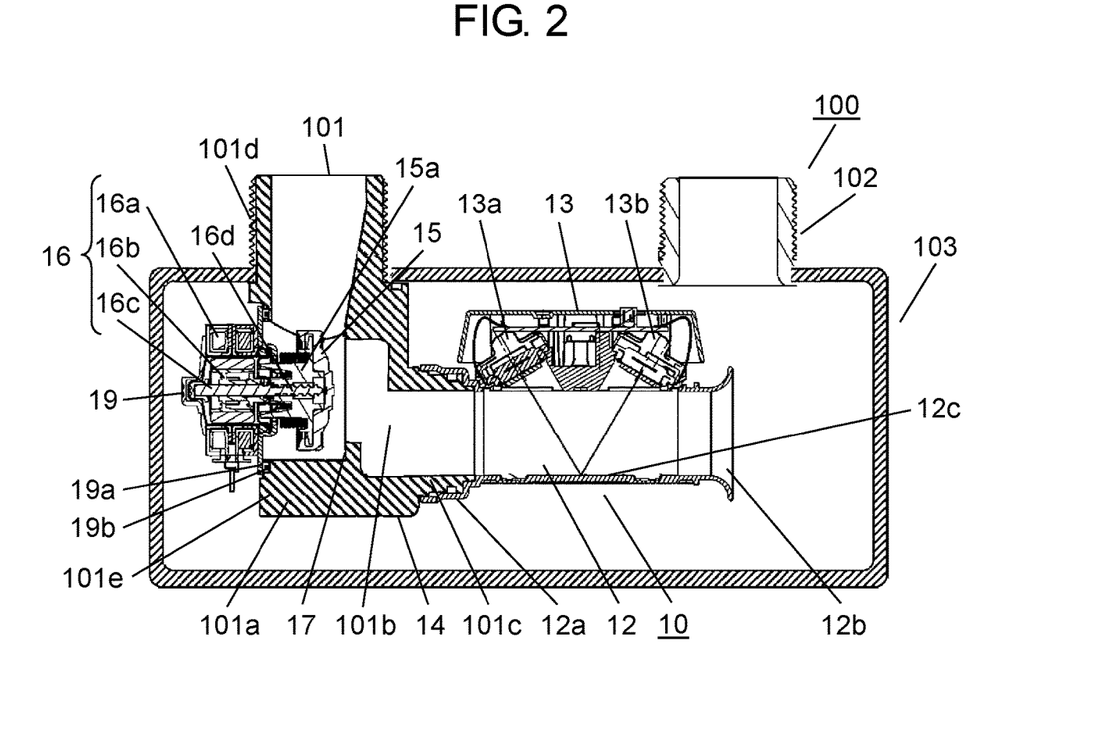
FIG. 2 is a side sectional view of the gas meter according to the first exemplary embodiment of the present invention.

FIG. 1 is a side sectional view of a principle part of gas meter 100 according to a first exemplary embodiment. FIG. 2 is a side sectional view of gas meter 100 according to the first exemplary embodiment, gas meter 100 including shutoff valve 14 and flow rate measurement unit 10.

Gas meter 100 includes meter inlet 101 and meter outlet 102 that are formed on the same face of meter body 103 (i.e., a top face of meter body 103 shown in FIGS. 1 and 2). Inside meter body 103, flow rate measurement unit 10 and shutoff valve 14 are placed to be connected to each other.

Extended section 101a extended to the interior of meter body 103 is formed on meter inlet 101. According to this exemplary embodiment, meter inlet 101 has a screw thread 101d on its entrance portion, and screw thread 101d is used for connecting meter inlet 101 to a pipe. Meter inlet 101 is integral with extended section 101a.

Internal passage 101b is formed inside extended section 101a. Extended section outlet 101c of extended section 101a is connected to lead-in port 12a of flow rate measurement unit 10. Internal passage 101b thus communicates with measurement flow passage 12. Extended section 101a is provided with fitting portion 101e for driver 19. Flange 19a of driver 19 is fixed airtightly to fitting portion 101e with O-ring 19b interposed therebetween, using screws or the like (not depicted). On a middle part of internal passage 101b, valve seat 17 is formed. Valve body 15 driven by driver 19 comes in contact with valve seat 17 to block up internal passage 101b, thus cutting off a flow of an incoming gas from meter inlet 101.

Driver 19 is composed of motor 16 having stator 16a, rotor 16b, and rotating shaft 16c, and a linear motion mechanism which screws male screw 16d formed on a front end of rotating shaft 16c into female screw 15a of valve body 15 to thereby transform rotation of rotating shaft 16c into a linear motion. Driver 19 thus causes valve body 15 to move.

Flow rate measurement unit 10 includes measurement flow passage 12 provided with lead-in port 12a and lead-out port 12b for a gas, i.e., fluid-to-be-measured, and flow rate measurement block 13 that measures a flow rate of the gas flowing through the measurement flow passage 12.

At flow rate measurement unit 10, a measurement method utilizing ultrasonic wave is used. Specifically, a pair of ultrasonic transceivers 13a, 13b disposed in flow rate measurement block 13 are used. For example, an ultrasonic wave transmitted from ultrasonic transceiver 13a into measurement flow passage 12 propagates through a gas, is reflected by inner wall 12c of measurement flow passage 12, inner wall 12c being counter to ultrasonic transceiver 13a, and further propagates through the gas to reach ultrasonic transceiver 13b. A time that the ultrasonic wave takes to travel from ultrasonic transceiver 13a to ultrasonic transceiver 13b in this manner is measured. Based on this measured time, a flow velocity of the gas is determined, and, finally, a flow rate of the gas is determined.

As described above, according to gas meter 100 of this exemplary embodiment, because shutoff valve 14 and flow rate measurement unit 10 are directly connected together, the gas, i.e., fluid-to-be-measured flows directly into the measurement flow passage without spreading in meter body 103. Gas flow, therefore, becomes constant without being affected by a shape of meter body 103. Hence, stable flow rate measurement can be performed regardless of the shape of the body of the gas meter. In addition, shutoff valve 14 and flow rate measurement unit 10 can be directly connected across a minimum distance, which allows downsizing of gas meter 100.

Second Exemplary Embodiment

Figure 3:
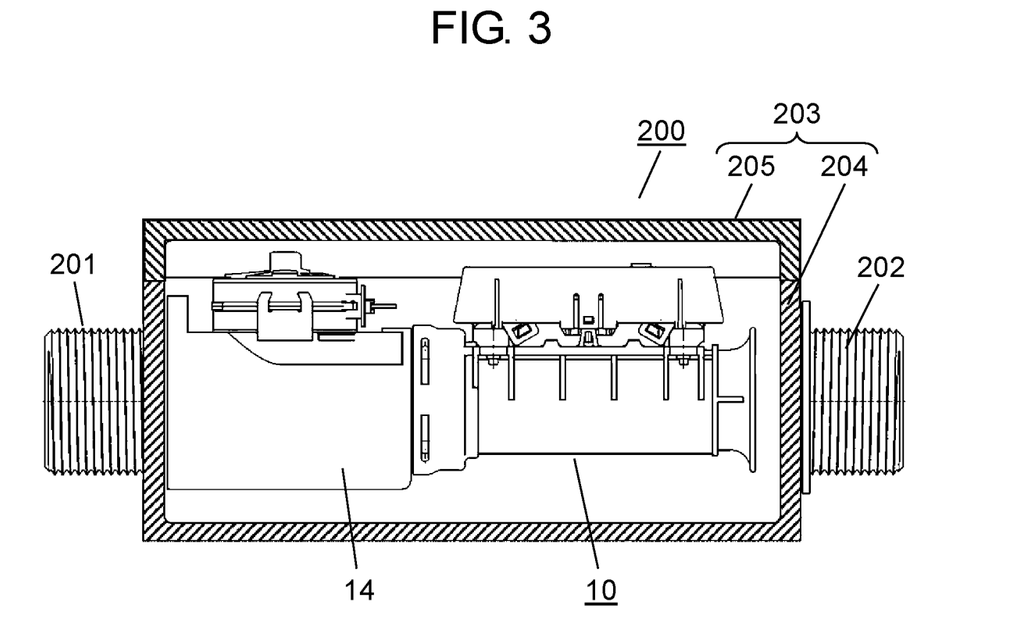
FIG. 3 is a side sectional view of a principle part of a gas meter according to a second exemplary embodiment of the present invention.
Figure 4:
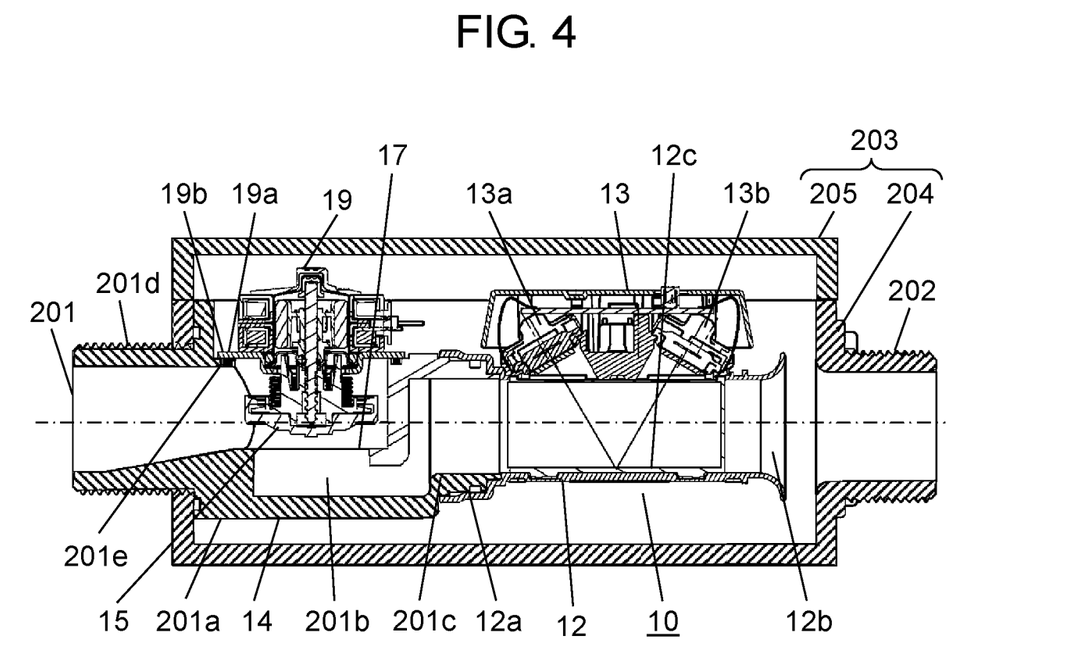
FIG. 4 is a side sectional view of the gas meter according to the second exemplary embodiment of the present invention.

FIG. 3 is a side sectional view of a principle part of gas meter 200 according to a second exemplary embodiment. FIG. 4 is a side sectional view of gas meter 200 according to the second exemplary embodiment, gas meter 200 including shutoff valve 14 and flow rate measurement unit 10.

Gas meter 200 includes meter inlet 201 and meter outlet 202 that are formed respectively on opposed faces of meter body 203 (i.e., left and right side faces of meter body 203 shown in FIGS. 3 and 4) such that meter inlet 201 and meter outlet 202 are aligned along their common straight center line. Inside meter body 203, flow rate measurement unit 10 and shutoff valve 14 are placed such that they are connected to each other. Meter body 203 is composed of lower case 204 and upper case 205. Lower case 204 has meter inlet 201 and meter outlet 202.

Extended section 201a extended to the interior of meter body 203 is formed on meter inlet 201. According to this exemplary embodiment, meter inlet 201 has a screw thread 201d on its entrance portion, and screw thread 201d is used for connecting meter inlet 201 to a pipe. Meter inlet 201 is integral with extended section 201a.

Internal passage 201b is formed inside extended section 201a. Extended section outlet 201c of extended section 201a is connected to lead-in port 12a of flow rate measurement unit 10. Internal passage 201b thus communicates with measurement flow passage 12. Extended section 201a is provided with fitting portion 201e for driver 19. Flange 19a of driver 19 is fixed airtightly to fitting portion 201e with O-ring 19b interposed therebetween, using screws or the like (not depicted). On a middle part of internal passage 201b, valve seat 17 is formed. Valve body 15 driven by driver 19 comes in contact with valve seat 17 to block up internal passage 201b, thus cutting off a flow of an incoming gas from meter inlet 201.

The above configuration offers the same effect as offered by the configuration of the first exemplary embodiment. As shown in FIG. 4, meter inlet 201, lead-in port 12a, lead-out port 12b, and meter outlet 202 are arranged to be aligned along their common straight center line. This configuration, compared to the configuration of the first exemplary embodiment, allows further downsizing of the gas meter. In addition, the gas meter can be attached to a middle part of a straight pipe. This improves a degree of freedom in installing the gas meter.

Third Exemplary Embodiment

Figure 5:
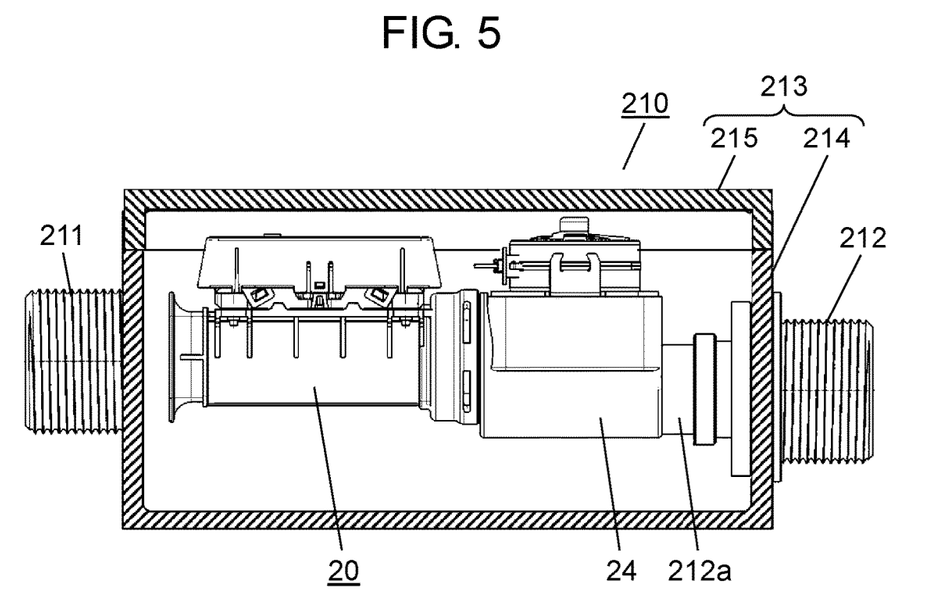
FIG. 5 is a side sectional view of a principle part of a gas meter according to a third exemplary embodiment of the present invention.
Figure 6:
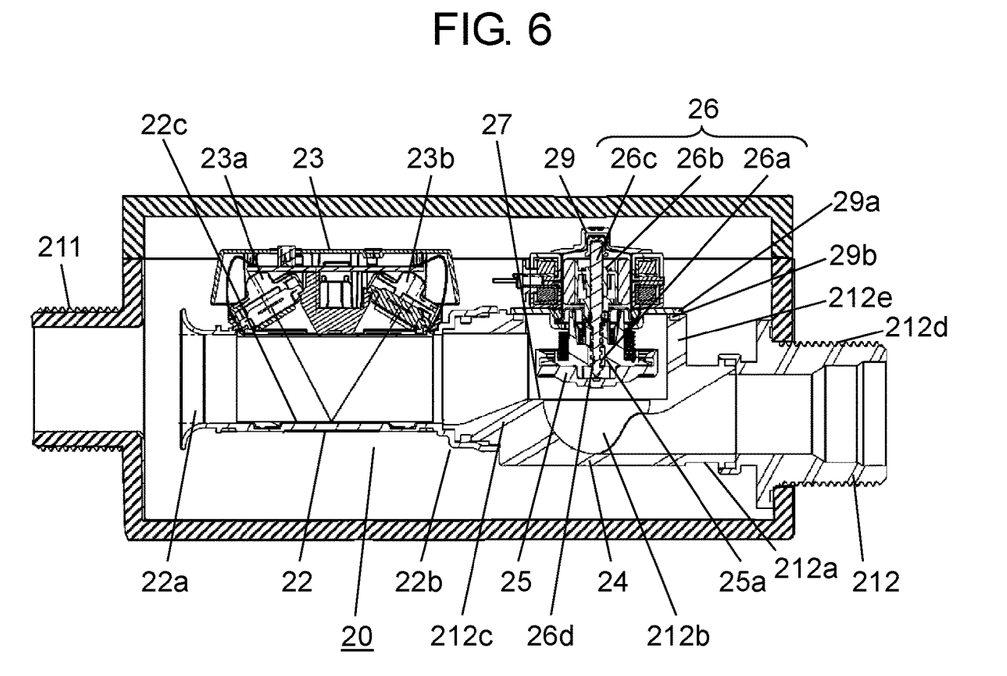
FIG. 6 is a side sectional view of the gas meter according to the third exemplary embodiment of the present invention.

FIG. 5 is a side sectional view of a principle part of gas meter 210 according to a third exemplary embodiment. FIG. 6 is a side sectional view of gas meter 210 according to the third exemplary embodiment, gas meter 210 including shutoff valve 24 and flow rate measurement unit 20.

Gas meter 210 includes meter inlet 211 and meter outlet 212 that are formed respectively on opposed faces of meter body 213 (i.e., left and right side faces of meter body 213 shown in FIGS. 5 and 6) such that meter inlet 211 and meter outlet 212 are aligned along their common straight center line. Inside meter body 213, flow rate measurement unit 20 and shutoff valve 24 are placed such that they are connected to each other. Meter body 213 is composed of lower case 214 and upper case 215. Lower case 214 has meter inlet 211 and meter outlet 212.

On meter outlet 212, extended section 212a is formed, which is extended to the interior of meter body 213. According to this exemplary embodiment, meter outlet 212 has a screw thread 212d formed on its exit portion, screw thread 212d being used for connecting meter outlet 212 to a pipe, and is connected airtightly to shutoff valve 24 via an O-ring or the like. Shutoff valve 24 and extended section 212a may be formed integrally together, as shown in FIGS. 5 and 6.

Internal passage 212b is formed inside extended section 212a. Inlet 212c of extended section 212a is connected to lead-out port 22b of flow rate measurement unit 20. Internal passage 212b thus communicates with measurement flow passage 22. Extended section 212a is provided with fitting portion 212e for fitting driver 29. Flange 29a of driver 29 is fixed airtightly to fitting portion 212e of meter outlet 212 with O-ring 29b interposed between flange 29a and fitting portion 212e, using screws or the like (not depicted). On a middle part of internal passage 212b, valve seat 27 is formed. Valve body 25 driven by driver 29 comes in contact with valve seat 27 to block up internal passage 212b, thus cutting off a flow of an outgoing gas coming out of meter outlet 212.

Driver 29 is composed of motor 26 having stator 26a, rotor 26b, and rotating shaft 26c, and a linear motion mechanism which screws male screw 26d formed on a front end of rotating shaft 26c into female screw 25a of valve body 25 to thereby transform rotation of rotating shaft 26c into a linear motion. Driver 29 thus causes valve body 25 to move.

Flow rate measurement unit 20 includes measurement flow passage 22 provided with lead-in port 22a and lead-out port 22b for a gas, i.e., fluid-to-be-measured, and flow rate measurement block 23 that measures a flow rate of the gas flowing through the measurement flow passage 22.

At flow rate measurement unit 20, a measurement method utilizing ultrasonic wave is used. Specifically, a pair of ultrasonic transceivers 23a, 23b disposed in flow rate measurement block 23 are used. For example, an ultrasonic wave transmitted from ultrasonic transceiver 23a into measurement flow passage 22 propagates through a gas, is reflected by inner wall 22c of measurement flow passage 22, inner wall 22c being counter to ultrasonic transceiver 23a, and further propagates through the gas to reach ultrasonic transceiver 23b. A time that the ultrasonic wave takes to travel from ultrasonic transceiver 23a to ultrasonic transceiver 23b in this manner is measured. Based on this measured time, a flow velocity of the gas is determined, and, finally, a flow rate of the gas is determined.

According to gas meter 210 of this embodiment, shutoff valve 24 and flow rate measurement unit 20 can be directly connected across a minimum distance. This allows downsizing of gas meter 210. In addition, gas meter 210 can be attached to a middle part of a straight pipe. This improves a degree of freedom in installing gas meter 210.

As described above, a gas meter according to a first aspect of the present disclosure includes a meter body having a meter inlet into which a fluid-to-be-measured flows and a meter outlet from which the fluid-to-be-measured flows out, and an extended section extended from the meter inlet to the interior of the meter body. The gas meter further includes a flow rate measurement unit disposed inside the meter body, the flow rate measurement unit having a measurement flow passage having a straight tubular shape and provided with a lead-in port and a lead-out port for the fluid-to-be-measured, and a shutoff valve disposed in an internal passage of the extended section. In the flow rate measurement unit, the lead-in port is airtightly connected to the extended section to communicate with the internal passage.

With this configuration, a gas flow from the shutoff valve to the flow rate measurement unit becomes constant. As a result, stable flow rate measurement can be performed regardless of a shape of the gas meter. In addition, the shutoff valve and the flow rate measurement unit can be directly connected across a minimum distance, which allows downsizing of the gas meter.

The gas meter according to a second aspect of the present disclosure is the gas meter according to the first aspect of the present disclosure configured such that the meter inlet and the meter outlet may be disposed linearly and that the flow rate measurement unit may be disposed such that a center line of the measurement flow passage is substantially matched with a line from a center of the meter inlet to a center of the meter outlet.

A gas meter according to a third aspect of the present disclosure includes a meter body having a meter inlet into which a fluid-to-be-measured flows and a meter outlet from which the fluid-to-be-measured flows out, and an extended section extended from the meter outlet to the interior of the meter body. The gas meter further includes a flow rate measurement unit disposed inside the meter body, the flow rate measurement unit having a measurement flow passage having a straight tubular shape and provided with a lead-in port and a lead-out port for the fluid-to-be-measured, and a shutoff valve disposed in an internal passage of the extended section. In the flow rate measurement unit, the lead-out port is airtightly connected to the extended section to communicate with the internal passage.

With this configuration, the shutoff valve and the flow rate measurement unit can be directly connected across a minimum distance, which allows downsizing of the gas meter.

The gas meter according to a fourth aspect of the present disclosure is the gas meter according to the third aspect of the present disclosure configured such that the meter inlet and the meter outlet may be disposed substantially linearly and that the flow rate measurement unit may be disposed such that a center line of the measurement flow passage is substantially matched with a line from a center of the meter inlet to a center of the meter outlet.

INDUSTRIAL APPLICABILITY

The gas meter of the present invention allows downsizing of a gas meter having a cutoff function.

REFERENCE MARKS IN THE DRAWINGS 10, 20: flow rate measurement unit
12, 22: measurement flow passage
12a, 22a: lead-in port
12b, 22b: lead-out port
14, 24: shutoff valve
19, 29: driver
100, 200, 210: gas meter
101, 201, 211: meter inlet
101a, 201a, 212a: extended section
101b, 201b, 212b: inner passage
102, 202, 212: meter outlet
103, 203, 213: meter body

The invention claimed is:

1. A gas meter comprising:
a meter body having a meter inlet into which a fluid-to-be-measured is to flow and a meter outlet from which the fluid-to-be-measured is to flow out;
an extended section extending from the meter inlet to an interior of the meter body;
a flow rate measurement unit disposed inside the meter body, the flow rate measurement unit including a measurement flow passage having a straight tubular shape and provided with a lead-in port and a lead-out port for the fluid-to-be-measured, and a flow rate measurement block configured to measure a flow rate of the fluid-to-be-measured flowing through the measurement flow passage; and
a shutoff valve disposed in an internal passage of the extended section,
wherein:
the extended section is configured separately from the flow rate measurement unit;
the lead-in port of the flow rate measurement unit is airtightly connected to the extended section so as to communicate with the internal passage, and the lead-out port of the flow rate measurement unit opens inside the meter body;
the meter inlet and the meter outlet are disposed linearly;
the shutoff valve includes a valve seat formed on the internal passage and a valve body configured to block the internal passage by coming into contact with the valve seat;
the flow rate measurement block and a driver configured to drive the valve body of the shutoff valve are disposed on a same side with respect to a center line of the measurement flow passage; and
the flow rate measurement unit and the shutoff valve are disposed in a same continuous opening of the meter body.

2. The gas meter according to claim 1, wherein
the extended section is inserted into the flow rate measurement unit, whereby the lead-in port is airtightly connected to the extended section.

3. The gas meter according to claim 1, wherein
the meter inlet, the lead-in port, the lead-out port, and the meter outlet are aligned along a common straight center line which is the center line of the measurement flow passage.

4. The gas meter according to claim 1, wherein:
the extended section has an extended section outlet; and
an outer circumferential surface of the extended section outlet is disposed inside an inner circumferential surface of the lead-in port.

5. A gas meter comprising:
a meter body having a meter inlet into which a fluid-to-be-measured is to flow and a meter outlet from which the fluid-to-be-measured is to flow out;
an extended section extending from the meter outlet to an interior of the meter body;
a flow rate measurement unit disposed inside the meter body, the flow rate measurement unit having a measurement flow passage having a straight tubular shape and provided with a lead-in port and a lead-out port for the fluid-to-be-measured, and a flow rate measurement block configured to measure a flow rate of the fluid-to-be-measured flowing through the measurement flow passage; and
a shutoff valve disposed in an internal passage of the extended section,
wherein:
the extended section is configured separately from the flow rate measurement unit;
the lead-out port of the flow rate measurement unit is airtightly connected to the extended section so as to communicate with the internal passage, and the lead-in port of the flow rate measurement unit opens inside the meter body;
the meter inlet and the meter outlet are disposed linearly;
the shutoff valve includes a valve seat formed on the internal passage and a valve body configured to block the internal passage by coming into contact with the valve seat;
the flow rate measurement block and a driver configured to drive the valve body of the shutoff valve are disposed on a same side with respect to a center line of the measurement flow passage; and
the flow rate measurement unit and the shutoff valve are disposed in a same continuous opening of the meter body.

6. The gas meter according to claim 5, wherein
the extended section is inserted into the flow rate measurement unit, whereby the lead-out port is airtightly connected to the extended section.

7. The gas meter according to claim 5, wherein
the meter inlet and the lead-in port to face each other.

8. The gas meter according to claim 5, wherein
the extended section has an extended section inlet; and
an outer circumferential surface of the extended section inlet is disposed inside an inner circumferential surface of the lead-out port.

\* \* \* \* \*